United States Patent [19]

Heyraud

[11] Patent Number: 5,488,260
[45] Date of Patent: Jan. 30, 1996

[54] ENCAPSULATED MAGNETS IN A PERMANENT MAGNET ROTOR

[75] Inventor: Marc A. Heyraud, La Chaux de Fonds, Switzerland

[73] Assignee: Johnson Electric S.A., Switzerland

[21] Appl. No.: 138,249

[22] Filed: Oct. 15, 1993

[51] Int. Cl.⁶ .................................................. H02K 21/12
[52] U.S. Cl. ......................... 310/156; 310/42; 29/598; 335/296
[58] Field of Search ..................... 310/43, 42, 44, 310/45, 156; 29/598; 335/296, 302, 306

[56] References Cited

U.S. PATENT DOCUMENTS

| 2,299,589 | 10/1942 | Reis | 310/156 |
|---|---|---|---|
| 2,488,729 | 11/1949 | Kooyman | 310/156 |
| 3,169,203 | 2/1965 | Lavin et al. | 310/156 |
| 3,246,187 | 4/1966 | Iemura | 310/156 |
| 4,864,174 | 9/1989 | Kawamura et al. | 310/156 |
| 4,983,866 | 1/1991 | Lok | 310/43 |
| 5,121,021 | 6/1992 | Ward | 310/154 |

*Primary Examiner*—Steven L. Stephan
*Assistant Examiner*—D. R. Haszko
*Attorney, Agent, or Firm*—Ostrolenk, Faber, Gerb & Soffen

[57] ABSTRACT

In a permanent magnet rotor, the circumferential gaps between circumferentially spaced sintered or cast magnets are filled by a plastic or resin material which also coats the outer circumferential surface of the magnets to secure the magnets to the rotor base. The plastic or resin material has a filler of particulate permanent magnet material to thereby provide a more gradual circumferential variation in magnetic flux between circumferentially adjacent magnets.

12 Claims, 1 Drawing Sheet

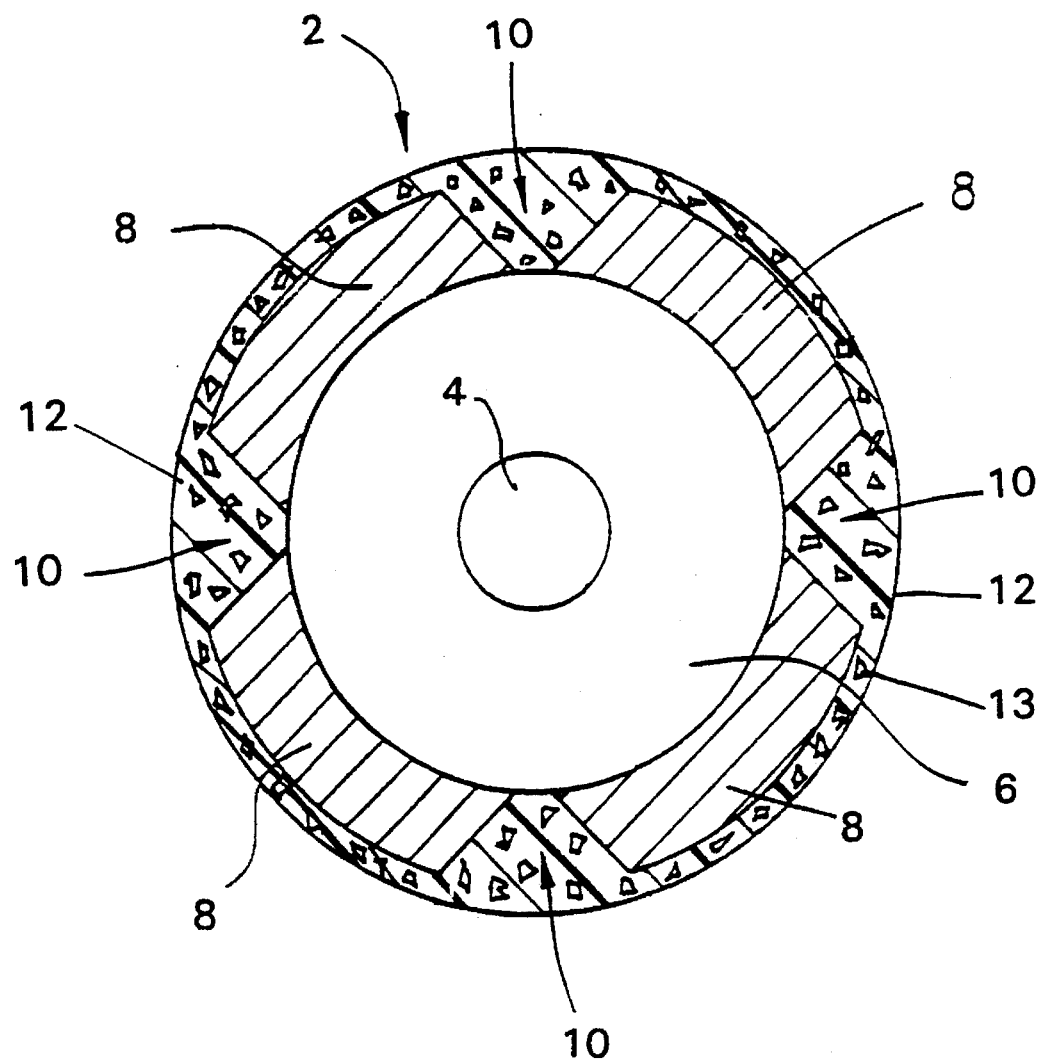

ENCAPSULATED MAGNETS IN A PERMANENT MAGNET ROTOR

BACKGROUND OF THE INVENTION

The present invention relates to a rotor for an electric motor having encapsulated permanent magnets. Such rotors are used particularly in brushless motors.

Sintered anisotropic magnets have good magnetic properties, but they are not easily manufactured as precise multipolar radially oriented cylinders. As a result, they are normally formed as segmental magnets which must be mounted on the rotor. If magnet segments such as this are glued on to the rotor, problems may arise as a result of centrifugal forces and imprecise air gaps.

As disclosed in published specification No. 63-144745 (A) of Japanese Patent Application No. 61-290466, it is known to secure permanent magnets on the rotor base of a brushless motor by embedding the magnets in a coating of plastic or resin material which also fills the circumferential spaces between the magnets. This provides a simple way of securely and precisely positioning the magnet segments on the rotor. However, this does not provide the optimal flux because the radial spacing between the magnet segments and the stator is increased and because the circumferential spaces between the magnet segments are also filled with the non-magnetic plastic or resin material.

If the plastic or resin material is loaded with a particulate high permeability, low reluctance ferromagnetic filler material, such as soft iron filings, to overcome this problem, the filler material merely provides a flux leakage path between adjacent magnets and reduces the radial magnetic fields provided by the magnets.

SUMMARY OF THE INVENTION

It is an object of the present invention to reduce the disadvantages of known permanent magnet rotors and to provide a more efficient form of construction.

This is achieved by providing the plastics or resin material, in which the magnets are embedded, with a particulate permanent magnet filler material.

A filler material such as this has a relatively low permeability and high reluctance. However, when the magnets have been attached to the rotor base, embedded in the coating of plastic or resin material, and are subsequently magnetized in a charging operation, the particles of filler material are also permanently magnetized with an intensity which varies circumferentially, in each gap between adjacent magnets, from a maximum in one direction, adjacent one magnet, through zero, halfway between the first magnet and an adjacent second magnet, to a maximum in the opposite direction, adjacent the second magnet.

Thus, the present invention provides a permanent magnet rotor, for an electric motor, comprising a plurality of permanent magnets mounted about a rotor base, wherein the magnets are embedded in a plastic or resin material, having a filler of particulate permanent magnet material, which coats the outer circumferential surface of the magnets and fills the circumferential spaces between the magnets.

The plastic or resin material and its filler material form a sheath which secures the magnets to the rotor base so that it is unnecessary to rely on the use of adhesive material for this purpose. This is particularly advantageous where the magnets, such as sintered or cast magnets which deform during production, do not conform precisely to the shape of the rotor base.

By providing a filler of permanent magnet material, radial magnetic flux is provided throughout the circumferential extent of the rotor during charging of the permanent magnets mounted on the rotor base. This radial magnetic flux in the gap between each adjacent pair of magnets varies circumferentially from a maximum in one direction, adjacent the magnet on one side of the gap, to a maximum in the opposite direction, adjacent the magnet on the other side of the gap. The radial flux therefore only falls to zero along radial planes passing through the gaps between adjacent magnets. This has the added beneficial effect of reducing cogging which prevents smooth rotation of the rotor.

BRIEF DESCRIPTION OF THE DRAWING

The invention is further described by way of example with reference to the accompanying schematic drawing which shows a cross-section perpendicular to the axis of a permanent magnet rotor forming an embodiment of the invention.

DESCRIPTION OF THE PREFERRED EMBODIMENT

As shown in the drawing, a permanent magnet rotor 2 comprises a shaft 4 supporting a cylindrical base 6 carrying four radially magnetized sintered or cast permanent magnets 8 on its outer circumferential surface. The magnets 8 are spaced apart in the circumferential direction and the gaps 10 are filled by a plastic or resin material 12 which also coats the outer circumferential surface of the magnets 8. The plastic material may be "flashed" over the outer surface of the magnets 8 during an insert moulding process to secure the magnets 8 on the base 6.

The plastic or resin material 12 has a filler of particulate permanent magnet material 13, that is material which can be magnetized at the same time that the magnets 8 are magnetized, during a charging process following application of the plastic or resin material 12, so as to provide radial magnetic flux which varies in each gap 10 from a maximum in one direction, adjacent the magnet 8 on one side of the gap 10, to a maximum in the opposite direction, adjacent the magnet 8 on the other side of the gap 10.

What is claimed is:

1. A permanent magnet rotor for an electric motor, the rotor comprising:
    a cylindrical rotor base;
    a plurality of permanent magnets located circumferentially around said rotor base with a respective circumferential gap located between adjacent permanent magnets;
    a binder located in each of said gaps and having a magnetic material dispersed therein, said magnetic material in each said circumferential gap being magnetized with a radial magnetic flux which varies circumferentially across said gap.

2. The permanent magnet of claim 1, wherein said binder is formed of a resin material.

3. The permanent magnet of claim 1, wherein said binder also coats an outer circumferential surface of each of said plurality of permanent magnets.

4. The permanent magnet rotor of claim 1, wherein said radial magnetic flux is greatest in the area adjacent the permanent magnets and is the lowest in the area of said gaps which is located in between adjacent magnets.

5. The permanent magnet of claim 1, wherein the radial flux around said rotor only falls to zero along radial planes passing through the gaps between adjacent magnets.

6. The permanent magnet of claim 5, wherein said binder is formed of a resin material.

7. The permanent magnet of claim 4, wherein said binder is formed of a resin material.

8. A method for forming a permanent magnet rotor for an electric motor, the method comprising the steps of:

obtaining a cylindrical base having a plurality of blocks of permanent magnetic material located circumferentially around said rotor base with a respective circumferential gap located between adjacent blocks of permanent magnetic material, a binder being located in each of said gaps and having a magnetic material dispersed therein; and simultaneously magnetizing said blocks of permanent magnetic materials and said magnetic material dispersed in each said circumferential gap, said magnetic material dispersed in each said circumferential gap being magnetized with a radial magnetic flux which varies circumferentially across said gap.

9. The method of claim 8, wherein said binder is formed of a resin material.

10. The method of claim 8, wherein said binder coats an outer circumferential surface of each of the blocks of permanent magnetic material.

11. The method of claim 8, wherein said magnetizing step causes the radial magnetic flux in the area adjacent the permanent magnets to be greatest and the radial magnetic flux in the area between adjacent magnets to be lowest.

12. The method of claim 8, where said magnetizing step causes the radial magnetic flux between first and second of said permanent magnets to vary from a maximum level adjacent said first permanent magnet, through zero halfway between the first and second permanent magnets and back to a maximum level adjacent said second permanent magnet.

* * * * *